United States Patent

Morisono

(10) Patent No.: US 8,151,286 B2
(45) Date of Patent: Apr. 3, 2012

(54) DISK DEVICE

(75) Inventor: Koji Morisono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 458 days.

(21) Appl. No.: 12/388,615

(22) Filed: Feb. 19, 2009

(65) Prior Publication Data

US 2009/0235292 A1   Sep. 17, 2009

(30) Foreign Application Priority Data

Mar. 11, 2008  (JP) .................................. 2008-060691

(51) Int. Cl.
  *G11B 33/12*   (2006.01)
(52) U.S. Cl. ....................................................... 720/652
(58) Field of Classification Search .................... 720/652
  See application file for complete search history.

(56) References Cited

U.S. PATENT DOCUMENTS

| | | | | |
|---|---|---|---|---|
| 6,449,238 | B2 * | 9/2002 | Furukawa et al. | 720/675 |
| 2004/0205785 | A1 * | 10/2004 | Takahashi et al. | 720/601 |
| 2007/0067789 | A1 | 3/2007 | Omori | |
| 2008/0251706 | A1 * | 10/2008 | Suetsugu | 250/239 |

FOREIGN PATENT DOCUMENTS

| | | |
|---|---|---|
| EP | 0 869 500 A2 | 10/1998 |
| EP | 1 607 977 A2 | 12/2005 |
| JP | 05-258548 A | 10/1993 |
| JP | 10-134412 A | 5/1998 |
| JP | 11-25666 A | 1/1999 |
| JP | 11-242860 A | 9/1999 |
| JP | 2007-200465 A | 8/2007 |

* cited by examiner

*Primary Examiner* — Hoai V Ho
*Assistant Examiner* — Jay Radke
(74) *Attorney, Agent, or Firm* — Global IP Counselors

(57) ABSTRACT

A disk device includes a loader chassis, a control board, an optical pickup, a flexible flat cable, and a guide member. The loader chassis has a bottom plate with a through hole. The control board is fixedly attached to a lower face of the bottom plate of the loader chassis. The optical pickup is movable between inner and outer positions with respect to the loader chassis in inward and outward movement directions that are parallel to a radial direction of a disk. The flexible flat cable electrically connects the control board to the optical pickup and is partially disposed through the through hole. The flexible flat cable includes a bent end portion that is connected to the optical pickup. The guide member is formed on an upper face of the bottom plate of the loader chassis and guides the bent end portion upward with respect to the bottom plate.

4 Claims, 5 Drawing Sheets

DISK DEVICE

CROSS-REFERENCE TO RELATED APPLICATIONS

This application claims priority to Japanese Patent Application No. 2008-060691 filed on Mar. 11, 2008. The entire disclosure of Japanese Patent Application No. 2008-060691 is hereby incorporated herein by reference.

BACKGROUND OF THE INVENTION

1. Field of the Invention

The present invention generally relates to a disk device. More specifically, the present invention relates to a disk device having a flexible flat cable connected to an optical pickup.

2. Background Information

A conventional disk device has an optical pickup and a flexible flat cable connected to the optical pickup via a connector. A durability test of the disk device includes a durability test of 200,000 full seek operations with the disk device. For example, a plurality of (such as four) disk devices having a 45-pin flexible flat cable are readied for test use. The optical pickup of each of the disk devices is moved back and forth 200,000 times between innermost and outermost peripheries of a disk. Then, the flexible flat cable is checked for discontinuity. Japanese Laid-Open Patent Application Publication No. H11-242860 discusses related technology.

When the optical pickup is moved backward to the outermost periphery of the disk, a connected end of the flexible flat cable connected to the connector is pulled downward, so the radius of curvature of an arc-shaped bent-back portion of the connected end is smaller. Furthermore, the bent-back portion is bent relatively suddenly, so when the durability of 200,000 full seek operations is conducted, the flexible flat cable is repeatedly subjected to relatively large bending stress at the connected end between the flexible flat cable and the optical pickup. As a result, breakage occurs at the connected end, which means that the flexible flat cable has poor durability.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a disk device in which durability of a flexible flat cable connected to an optical pickup is improved.

In accordance with one aspect of the present invention, a disk device includes a loader chassis, a control board, an optical pickup, a flexible flat cable, and a guide member. The loader chassis has a bottom plate with a through hole. The control board is fixedly attached to a lower face of the bottom plate of the loader chassis. The optical pickup is movable between inner and outer positions with respect to the loader chassis in inward and outward movement directions that are parallel to a radial direction of a disk disposed in the loader chassis. The flexible flat cable electrically connects the control board to the optical pickup and is partially disposed through the through hole of the loader chassis. The flexible flat cable includes a bent end portion that is connected to the optical pickup. The guide member is formed on an upper face of the bottom plate of the loader chassis and guides the bent end portion upward with respect to the bottom plate when the optical pickup is located at the outer position with respect to the loader chassis.

With the disk device of the present invention, it is possible to provide a disk device in which durability of a flexible flat cable connected to an optical pickup is improved.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 1:
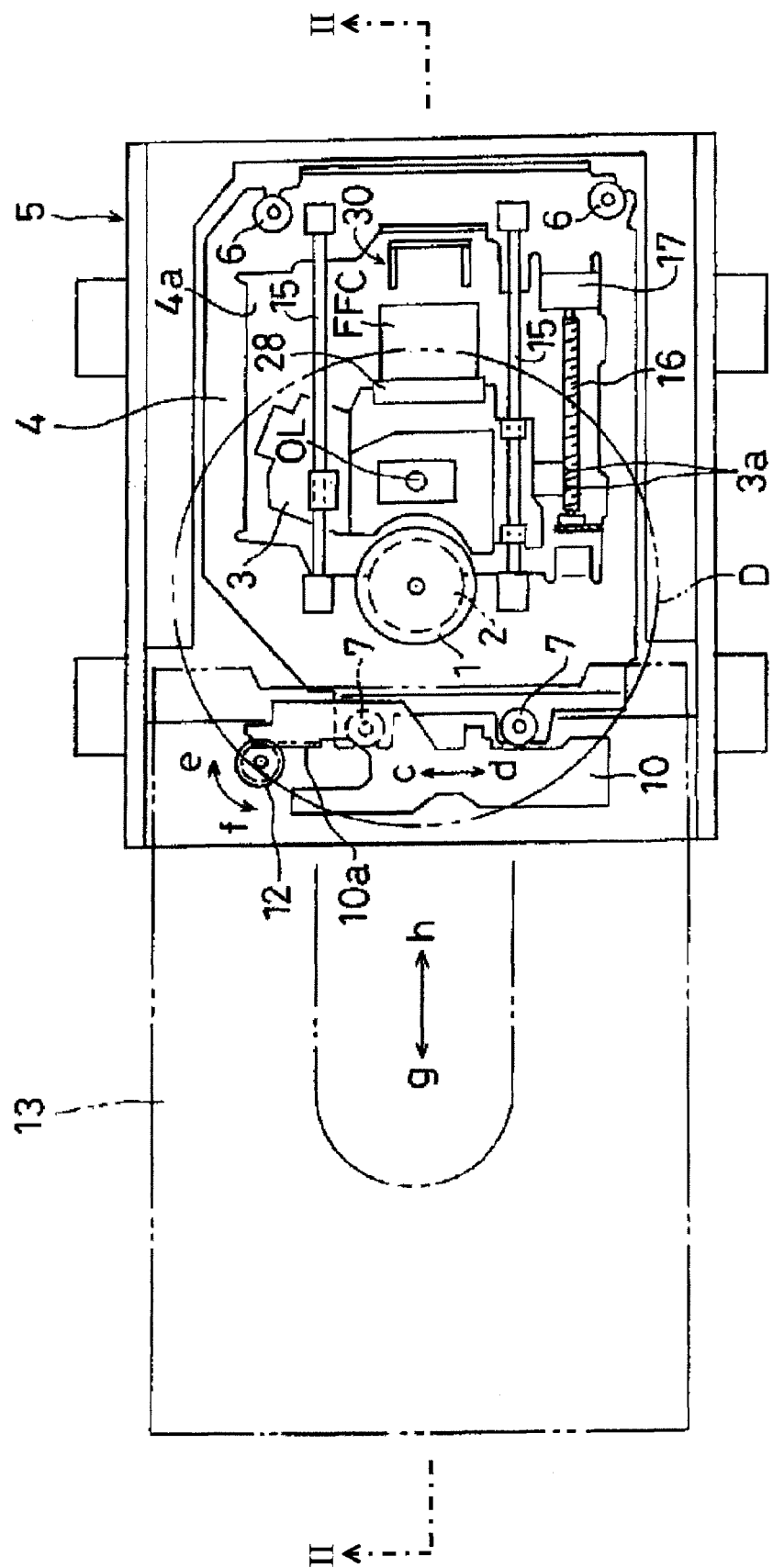
FIG. 1 is a top plan view of a disk device in accordance with one embodiment of the present invention.
Figure 2:
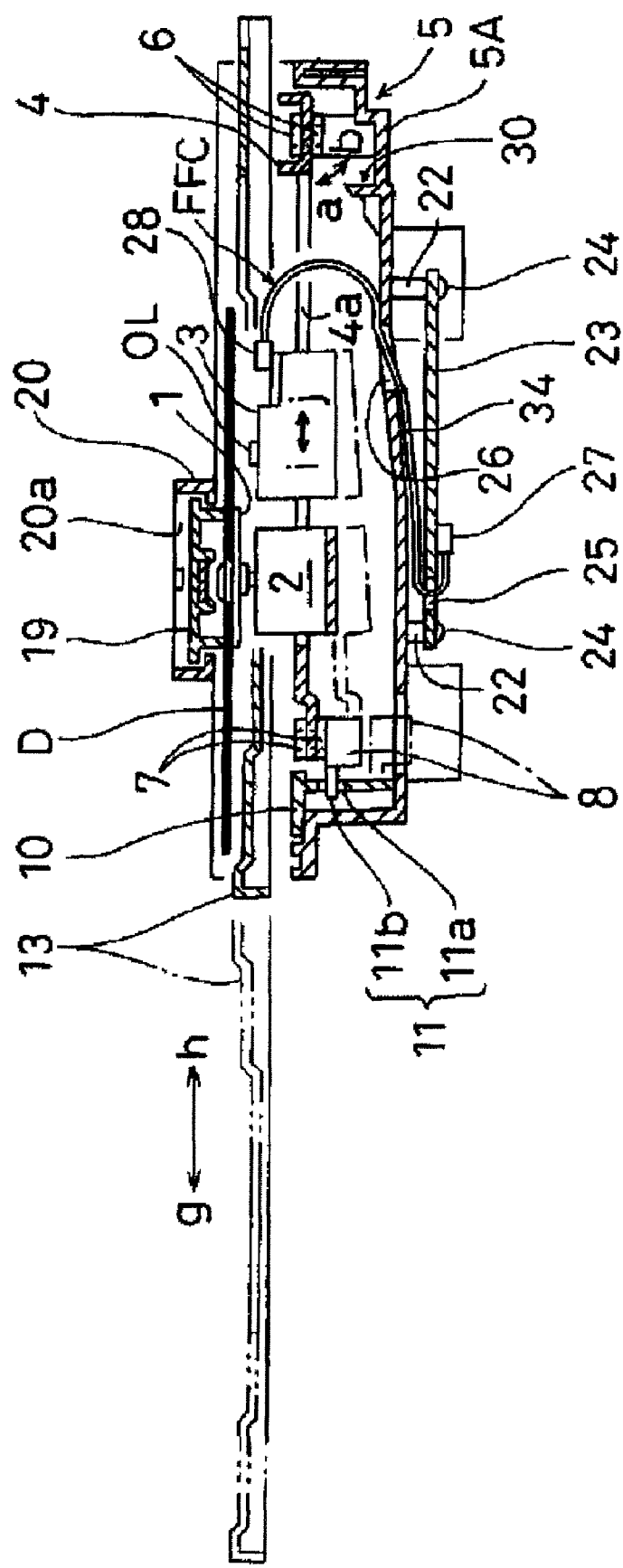
FIG. 2 is a cross sectional view of the disk device taken along II-II line illustrated in FIG. 1.

As shown in FIGS. 1 and 2, a disk device includes a turntable 1, a spindle motor 2, an optical pickup 3, a traverse chassis 4, a loader chassis 5, an elevator 8, a cam slider 10, a cam mechanism 11, a tray 13, a clamper 19, a control board 23, and a flexible flat cable FFC. The disk device is an optical disk device, such as a DVD recorder, a DVD player, a BD recorder, a BD player, or the like.

The turntable 1 is attached to the spindle motor 2. The optical pickup 3 includes an objective lens OL. The spindle motor 2 and the optical pickup 3 are mounted on the traverse chassis 4. The traverse chassis 4 is disposed within the loader chassis 5. A rear part of the traverse chassis 4 is linked via a rear elastic member 6 to the loader chassis 5 so as to be capable of up and down motion in directions along arrows a and b. A front part of the traverse chassis 4 is linked to the elevator 8 via a front elastic member 7. The rear and front elastic members 6 and 7 are made of rubber.

The cam slider 10 has a substantially T-shaped lateral cross section. The cam slider 10 is disposed at a front part of the loader chassis 5 and slidable in directions along arrows c and d. The cam slider 10 and the elevator 8 are conjointly linked by the cam mechanism 11. The cam mechanism 11 includes a cam groove 11a and a cam pin 11b. The cam groove 11a is formed in a vertical part of the cam slider 10. The cam pin 11b protrudes integrally from a front face of the elevator 8 and is fitted into the cam groove 11a. A cam rack 10a is integrally formed at one end of the cam slider 10. The cam rack 10a is formed so as to mesh with a drive pinion 12. The drive pinion 12 rotates in directions along arrows e and f. The drive pinion 12 is disposed at the front part of the loader chassis 5. The tray 13 on which a disk D is placed is disposed at an upper part of the loader chassis 5 so as to move in directions along arrows g and h. A rack (not shown) is formed on a lower face of the tray 13. The rack is formed so as to mesh with the drive pinion 12.

When the optical pickup 3 is disposed in a center opening 4a of the traverse chassis 4, the optical pickup 3 is supported by a guide rod 15 so as to move back and forth in directions along arrows i and j. A toothed component 3a is provided to the optical pickup 3. The toothed component 3a is meshed with a lead screw 16. The optical pickup 3 is moved back and forth along the allows i and j in a radial direction of the disk D between innermost and outermost peripheries (e.g., between inner and outer positions) of the disk D by a feed motor 17 via the lead screw 16 and the toothed component 3a. The clamper 19 is disposed elevatably within a specific range in a center through-hole 20a in a transverse beam 20 spanning between side plates of the loader chassis 5.

A plurality of legs 22 are provided integrally protruding from a lower face of a bottom plate 5A of the loader chassis 5. The control board 23 is fastened by a screw 24 in each of the legs 22. The control board 23 includes a printed circuit board. A cable insertion hole 25 and a cable insertion hole (e.g., through hole) 26 are formed in a front side of the control board 23 and a center of the bottom plate 5A, respectively. The flexible flat cable FFC connects the control board 23 and the optical pickup 3. The flexible flat cable FFC is disposed through the cable insertion holes 25 and 26. One end of the flexible flat cable FFC is connected to the control board 23 via a connector 27, and the other end of the flexible flat cable FFC is bent back in an arc shape and connected to the optical pickup 3 via a connector 28.

In play mode, as indicated by solid lines in FIGS. 1 and 2, the disk D is clamped by the turntable 1 and the clamper 19. Then, the disk D is rotated at high speed by the spindle motor 2 with the turntable 1. The optical pickup 3 is moved back and forth in the radial direction of the disk D. Specifically, the optical pickup 3 is movable with respect to the loader chassis 5 in inward and outward movement directions parallel to the radial direction of the disk D. The optical pickup 3 is controlled via the flexible flat cable FFC, so that a laser beam illuminates on the disk D emitted from the objective lens OL of the optical pickup 3, and information recorded on the disk D is read based on the reflected laser beam.

When the tray 13 is opened, as indicated by imaginary lines in FIGS. 1 and 2, the optical pickup 3 is moved forward in the direction of the arrow i and halted at the innermost periphery of the disk D. Then, the drive pinion 12 is rotated in the direction of the arrow f. As a result, the cam slider 10 slides in the direction of the arrow c via the cam rack 10a, the traverse chassis 4 is moved downward in the direction of the arrow b via the cam mechanism 11 and the elevator 8 into a tilted orientation, and the disk D is moved from the turntable 1 to the tray 13.

Then, the drive pinion 12 and the cam rack 10a are unmeshed. The pin (not shown) of the cam slider 10 moves the tray 13 slightly in the direction of the arrow g. The rack (not shown) formed on the lower face of the tray 13 is meshed with the drive pinion 12. The tray 13 is pushed out in the direction of the arrow g as the drive pinion 12 rotates in the direction of the arrow f. Then, the disk D on the tray 13 is replaced. When the tray 13 is closed, the operation is performed in a reverse order of the above.

Figure 3:
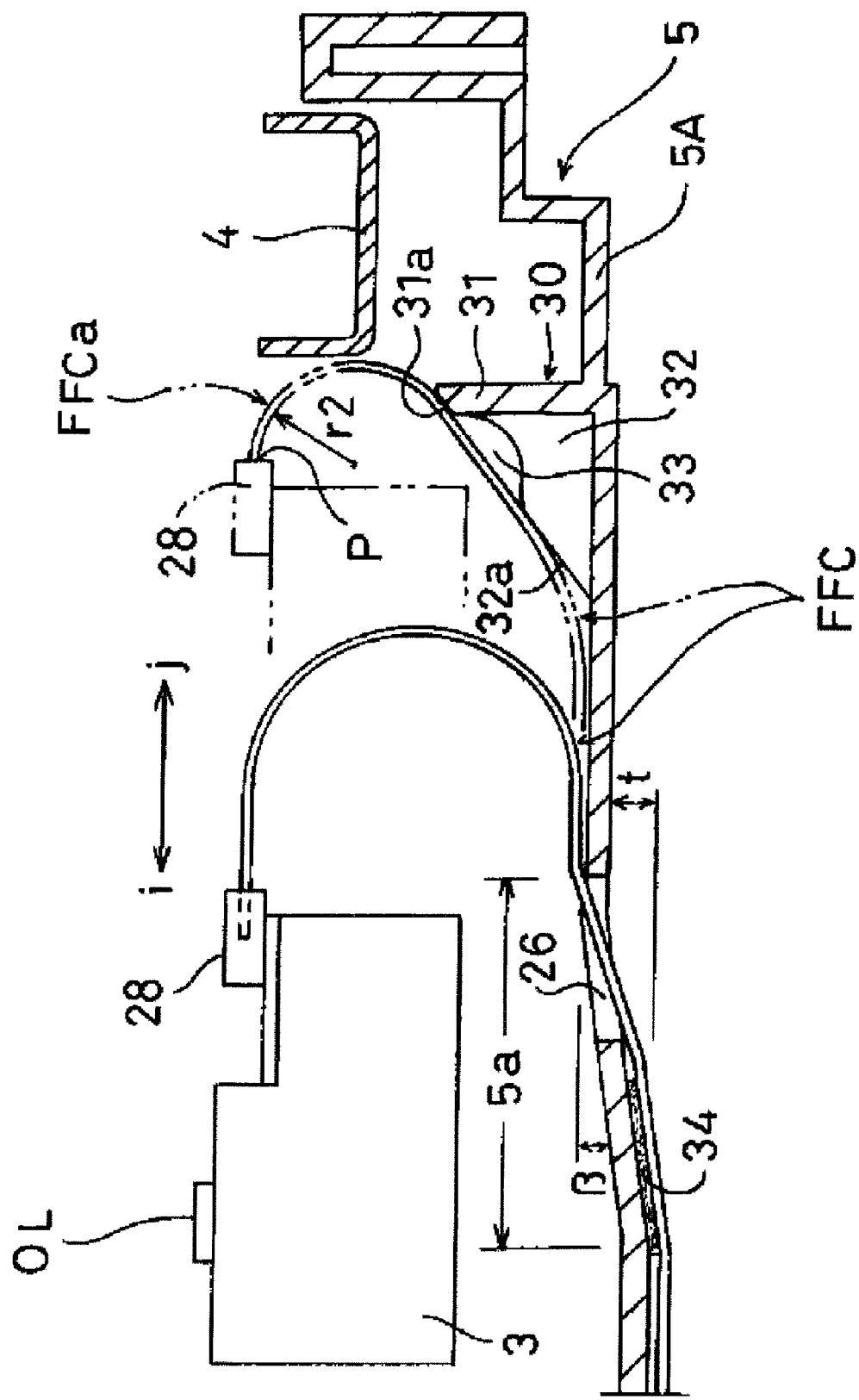
FIG. 3 is a detail cross sectional view of the disk device illustrated in FIG. 1.

As shown in FIGS. 1 to 3, a guide member 30 is integrally formed with the bottom plate 5A of the loader chassis 5 as a one-piece, unitary member. The guide member 30 guides an arc-shaped bent-back portion (e.g., bent end portion) FFCa of the other end of the flexible flat cable FFC upward and increases a radius of curvature r2 of the bent-back portion FFCa of the other end.

Figure 4A:
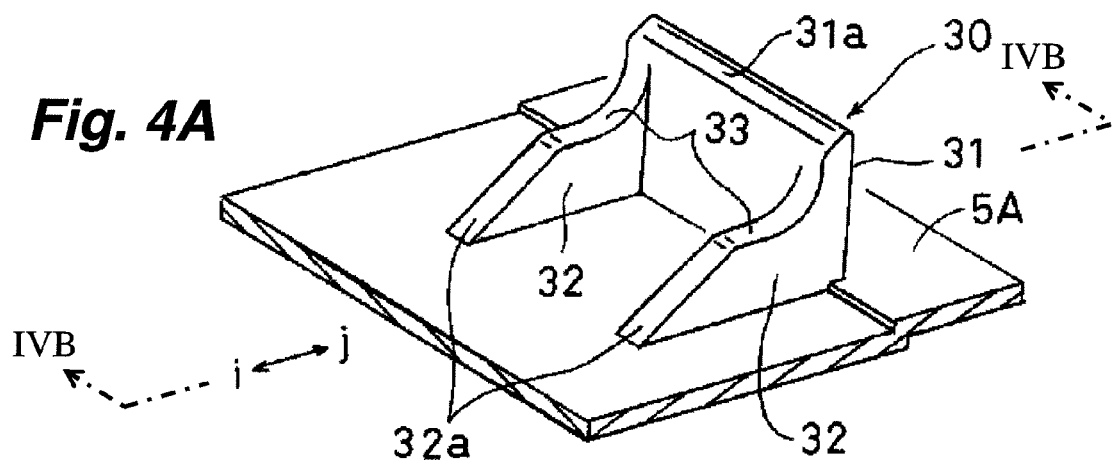
FIG. 4A is a perspective view of a guide member of the disk device illustrated in FIG. 1.
Figure 4B:
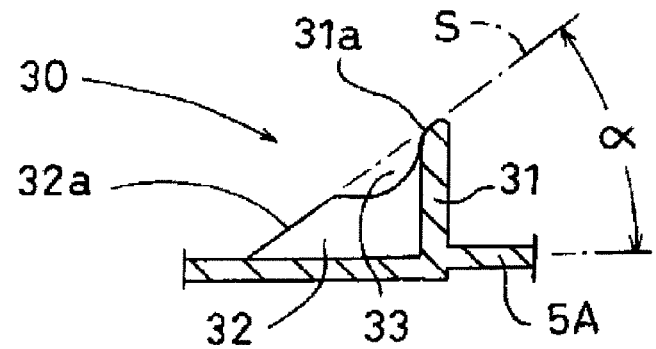
FIG. 4B is a cross sectional view of the guide member taken along IVB-IVB line illustrated in FIG. 4A.
Figure 4C:
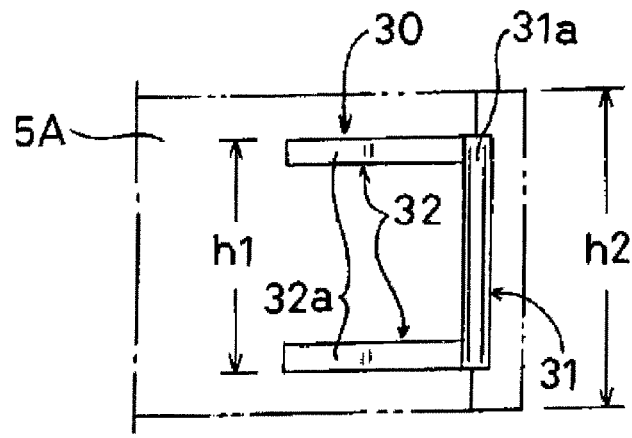
FIG. 4C is a top plan view of the guide member of the disk device illustrated in FIG. 1.

As shown in FIGS. 4A-4C, the guide member 30 includes a transverse guide plate (e.g., first guide plate) 31 and a pair of left and right longitudinal guide plates (e.g., second guide plates) 32. The transverse guide plate 31 is formed in a rectangular shape when viewed from a direction perpendicular to the transverse guide plate 31. The transverse guide plate 31 extends in a direction (e.g., transverse direction) that is perpendicular to the movement direction along the arrows i and j of the optical pickup 3. The left and right longitudinal guide plates 32 extend forward in the movement direction of the arrow i of the optical pickup 3 from both side edges (e.g., edge portions) of the transverse guide plate 31. The longitudinal guide plates 32 are substantially triangular when viewed from the side. The longitudinal guide plates 32 include cable-opposing faces (e.g., second upper slope faces) 32a. The cable-opposing faces 32a of the longitudinal guide plates 32 are tilted along an imaginary line S that extends upward from front ends of the longitudinal guide plates 32 toward the transverse guide plate 31 at a specific tilt angle $\alpha$ (such as 35°). The transverse guide plate 31 includes a tilted cable-opposing face (e.g., first upper slope face) 31a. The tilted cable-opposing face 31a is formed at an upper end of the transverse guide plate 31 along the imaginary line S. In other words, the cable-opposing faces 31a and 32a slope downward in the movement direction of the arrow i of the optical pickup 3.

Figure 5:
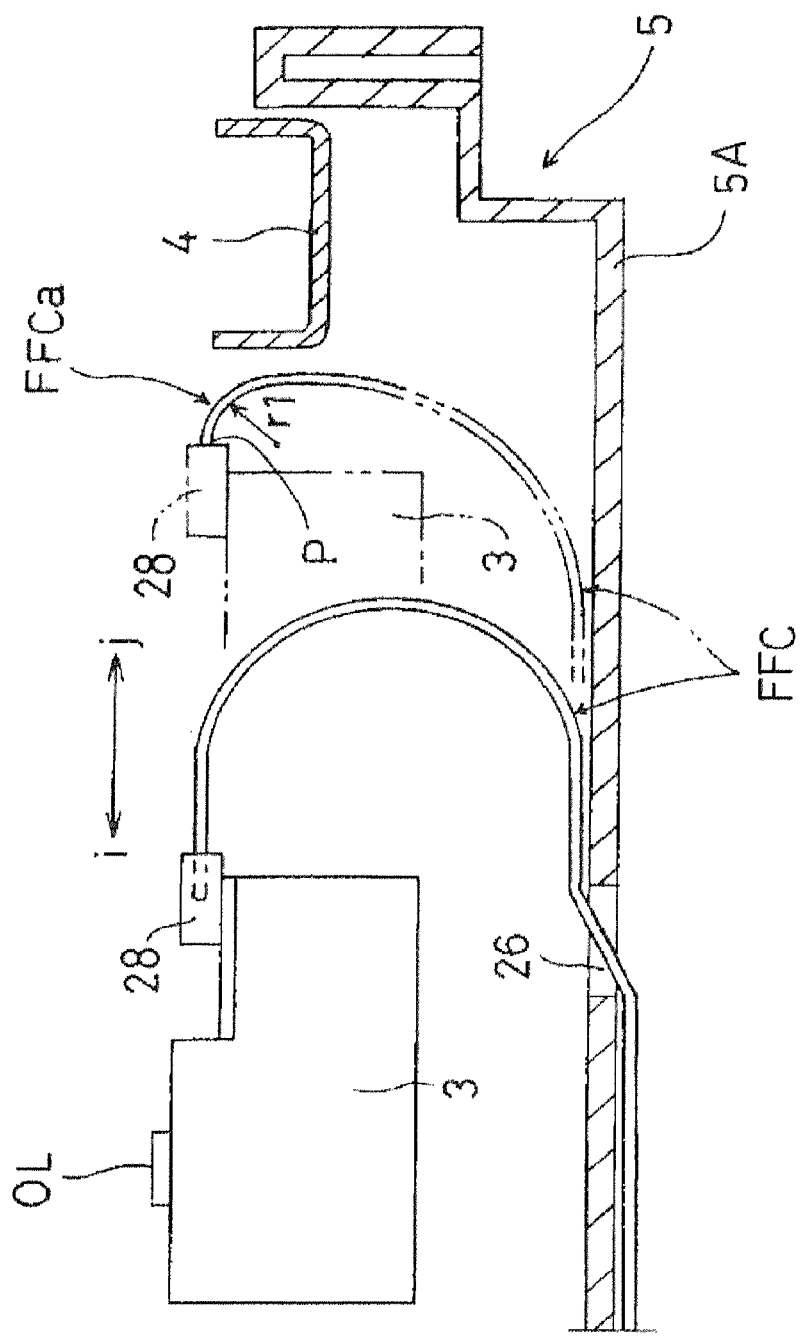
FIG. 5 is a cross sectional view of a disk device without a guide member.

The optical pickup 3 located at the innermost periphery of the disk D, as indicated by the solid lines in FIG. 3, is moved backward in the direction of the arrow j to the outermost periphery of the disk D, as indicated by the imaginary lines in FIG. 3. The bent-back portion FFCa of the other end of the flexible flat cable FFC contacts with the cable-opposing faces 32a of the longitudinal guide plates 32. Then, the bent-back portion FFCa contacts with the cable-opposing face 31a of the transverse guide plate 31 as the optical pickup 3 is moved towards the outermost periphery of the disk D. The bent-back portion FFCa is guided and pushed upward by the cable-opposing faces 31a and 32a of the transverse and longitudinal guide plates 31 and 32. As a result, the radius of curvature r2 of the bent-back portion FFCa becomes larger than radius of curvature of a bent-back portion FFCa of a disk device without the guide member 30 illustrated in FIG. 5. Specifically, as indicated by the imaginary line in FIG. 5, when the optical pickup 3 is moved backward to the outermost periphery of the disk D, the bent-back portion FFCa of the other end of the flexible flat cable FFC is pulled downward. As a result, the bent-back portion FFCa is bent relatively sharply, and the radius of curvature r1 of the bent-back portion FFCa near the connector 28 is smaller.

When the optical pickup 3 is moved backward in the direction of the arrow j to the outermost periphery of the disk D, because the bent-back portion FFCa of the flexible flat cable FFC is guided upward by the guide member 30, the radius of curvature r2 of the bent-back portion FFCa is larger than in the case of the disk device without the guide member 30. Thus, the bent-back portion FFCa is bent relatively gently. Accordingly, when the durability test of 200,000 full seek operations is conducted, the bending stress to which the flexible flat cable FFC is repeatedly subjected at a boundary portion P between the flexible flat cable FFC and the optical pickup 3 is less than in the case of the disk device without the guide member 30. Thus, no discontinuity occurs at the boundary portion P, and the durability of the flexible flat cable FFC can be increased.

Also, the bent-back portion FFCa of the other end of the flexible flat cable FFC is stably supported at three points by the cable-opposing faces 31a and 32a of the transverse guide plate 31 and the two longitudinal guide plates 32. The cable-opposing faces 31a and 32a of the transverse guide plate 31 and the two longitudinal guide plates 32 are tilted along the imaginary line S extending diagonally upward at the specific tilt angle α. Thus, the bent-back portion FFCa of the other end of the flexible flat cable FFC can be pushed up smoothly.

As shown in FIG. 4C, the transverse guide plate 31 extends in the direction perpendicular to the movement directions of the optical pickup 3. The lateral width h1 of the transverse guide plate 31 is set to be less than the lateral width h2 of the flexible flat cable FFC. Thus, the approximate center of the other end of the flexible flat cable FFC can be reliably supported by the transverse guide plate 31, without skewing in the width direction.

As shown in FIGS. 3 and 4A, upper parts of the longitudinal guide plates 32 are cut out to form recesses 33 between the cable-opposing face 31a of the transverse guide plate 31 and the cable-opposing faces 32a of the longitudinal guide plates 32. This reduces the contact surface area between the flexible flat cable FFC and the guide member 30, and decreases contact resistance. As a result, the flexible flat cable FFC can be guided upward more smoothly.

Also, since the transverse guide plate 31 and the longitudinal guide plates 32 are provided integrally protruding from the loader chassis 5. Thus, there is no increase in the number of parts required, which lowers the manufacturing cost of the disk device.

As shown in FIG. 3, an outward portion of the bottom plate 5A of the loader chassis 5 located in the rear of the cable insertion hole 26 is set higher by a specific distance t (such as 4 mm) than a cable-opposing portion (e.g., inward portion) 5a of the bottom plate 5A. The cable-opposing portion 5a of the bottom plate 5A is located in front of the cable insertion hole 26. The cable-opposing portion 5a is tilted upward at a specific tilt angle β (such as 5°) toward the guide member 30. In other words, the cable-opposing portion 5a is tilted downward in the movement direction of the arrow i of the optical pickup 3 with respect to the outward portion of the bottom plate 5A.

The flexible flat cable FFC is bonded with a double-sided adhesive tape 34 to the lower face of the tilted cable-opposing portion 5a.

Because the cable-opposing portion 5a of the bottom plate 5A of the loader chassis 5 in front of the cable insertion hole 26 is tilted, the flexible flat cable FFC can be easily routed along the tilt.

Also, because the flexible flat cable FFC is bonded to the lower face of the tilted cable-opposing portion 5a via the double-sided adhesive tape 34, even if the flexible flat cable FFC should be subjected to excessive tensile force during assembly, for example, the ends of the flexible flat cable FFC will not be unintentionally pulled away from the connectors 27 and 28 (e.g., from the control board 23 and the optical pickup 3) by the tensile force. Accordingly, the control board 23 and the optical pickup 3 can be reliably maintained in a state of being connected by the flexible flat cable FFC.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A disk device comprising:
   a loader chassis having a bottom plate with a through hole;
   a control board fixedly attached to a lower face of the bottom plate of the loader chassis;
   an optical pickup movable between inner and outer positions with respect to the loader chassis in inward and outward movement directions that are parallel to a radial direction of a disk disposed in the loader chassis;
   a flexible flat cable electrically connecting the control board to the optical pickup and partially disposed through the through hole of the loader chassis, the flexible flat cable including a bent end portion that is connected to the optical pickup; and
   a guide member formed on an upper face of the bottom plate of the loader chassis and guiding the bent end portion upward with respect to the bottom plate when the optical pickup is located at the outer position with respect to the loader chassis,
   the guide member including a first guide plate that is formed in a rectangular shape and extends in a transverse direction perpendicular to the inward and outward movement directions of the optical pickup with the first guide plate having an first upper slope face, and a pair of second guide plates that extend from edge portions of the first guide plate in the inward movement direction of the optical pickup with the second guide plates having second upper slope faces, respectively, and
   the first and second upper slope faces of the first and second guide plates sloping downward in the inward movement direction and guiding the bent end portion of the flexible flat cable upward.

2. The disk device according to claim 1, wherein
   the first and second upper slope faces of the first and second guide plates slopes along an imaginary line extending at a specific tilt angle from inward distal ends of the second guide plates toward an upper distal end of the first guide plate.

3. A disk device comprising:
   a loader chassis having a bottom plate with a through hole;

a control board fixedly attached to a lower face of the bottom plate of the loader chassis;

an optical pickup movable between inner and outer positions with respect to the loader chassis in inward and outward movement directions that are parallel to a radial direction of a disk disposed in the loader chassis;

a flexible flat cable electrically connecting the control board to the optical pickup and partially disposed through the through hole of the loader chassis, the flexible flat cable including a bent end portion that is connected to the optical pickup; and a guide member formed on an upper face of the bottom plate of the loader chassis and guiding the bent end portion upward with respect to the bottom plate when the optical pickup is located at the outer position with respect to the loader chassis, the bottom plate further including an inward portion that is located inward with respect to the through hole and an outward portion that is located outward with respect to the through hole with the inward portion being tilted at a specific angle with respect to the outward portion downward in the inward movement direction of the optical pickup, and a portion of the flexible flat cable being fixedly attached to a lower face of the inward portion of the bottom plate with double-sided adhesive tape.

4. The disk device according to claim 1, wherein the bottom plate further includes an inward portion that is located inward with respect to the through hole and an outward portion that is located outward with respect to the through hole with the inward portion being tilted at a specific angle with respect to the outward portion downward in the inward movement direction, and a portion of the flexible flat cable is fixedly attached to a lower face of the inward portion of the bottom plate with double-sided adhesive tape.

* * * * *